United States Patent [19]

Ezaki

[11] Patent Number: 4,659,531
[45] Date of Patent: Apr. 21, 1987

[54] METHOD AND APPARATUS FOR MANUFACTURING A HOLLOW PLASTIC PRODUCT

[75] Inventor: Yasuo Ezaki, Nitta, Japan

[73] Assignee: Excell Corporation, Tokyo, Japan

[21] Appl. No.: 663,810

[22] Filed: Oct. 22, 1984

[30] Foreign Application Priority Data

Feb. 13, 1984 [JP] Japan .................................. 59-22993

[51] Int. Cl.⁴ ............................................ B29C 49/20
[52] U.S. Cl. .................................... 264/515; 264/512; 264/516; 425/503; 425/112; 425/525
[58] Field of Search ............... 264/512, 513, 515, 516, 264/523, 540; 425/525, 503, 112

[56] References Cited

U.S. PATENT DOCUMENTS 4,239,474 12/1980 Nakagawa ...................... 264/542 X

FOREIGN PATENT DOCUMENTS 56-34433 4/1981 Japan .................................. 264/540

Primary Examiner—Jan Silbaugh
Attorney, Agent, or Firm—Alan H. MacPherson; Steven F. Caserza; Kenneth E. Leeds

[57] ABSTRACT

A method and apparatus for manufacturing a hollow plastic product is provided. In accordance with one aspect, into a mold half having a tubular groove portion and a projecting groove portion which projects outwardly from the tubular groove section is supplied a parison into the tubular groove portion and a clump of molding material into the projecting groove portion. When blow molding is carried out by introducing a pressurized gas into the parison, the clump becomes integrated with the parison thereby providing a hollow plastic product of unitary structure. In accordance with another aspect of the present invention, a parison extrusion nozzle is provided with at least two passages each of which is connected, preferably through a valve, to a corresponding dispensing unit for dispensing a desired molding material. A control unit is provided as connected to each of the dispensing units to control the supply of molding material so that there is obtained a parison having regions of different molding materials.

7 Claims, 14 Drawing Figures

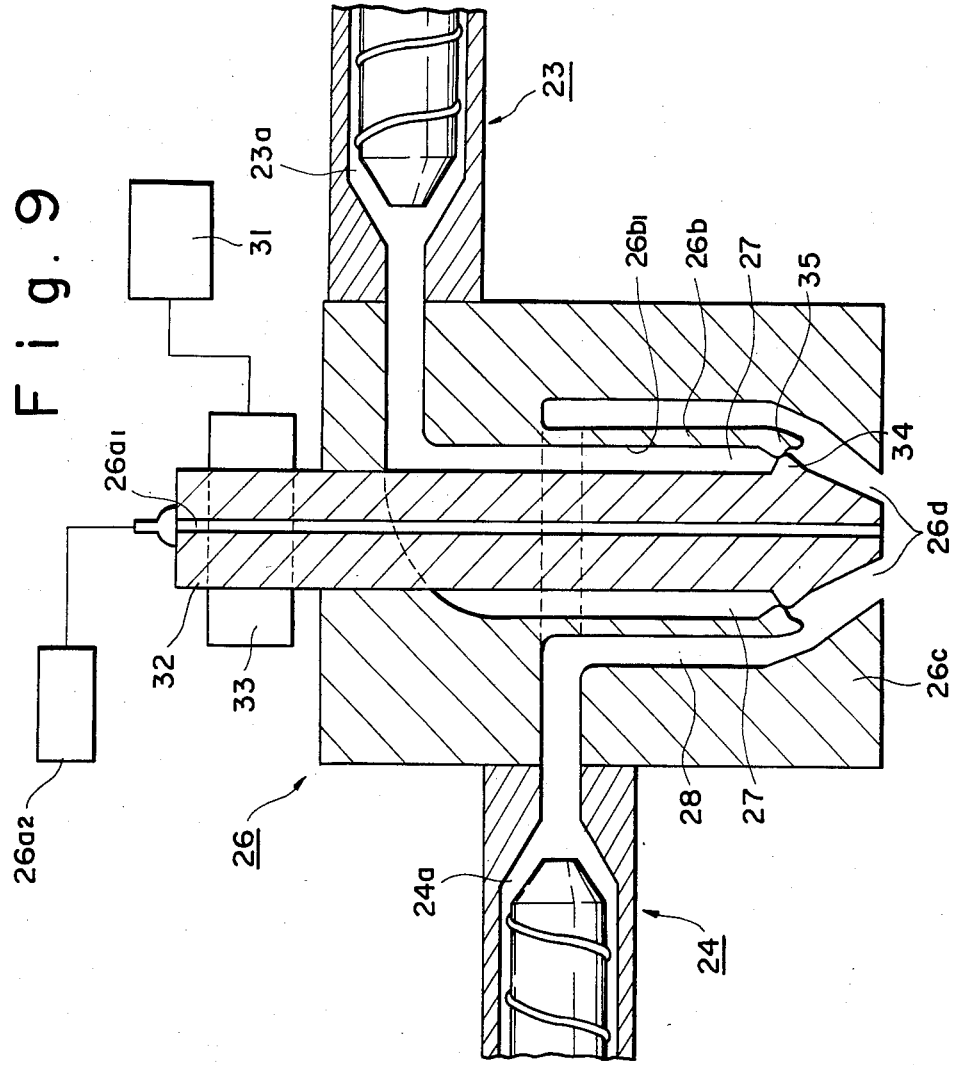

METHOD AND APPARATUS FOR MANUFACTURING A HOLLOW PLASTIC PRODUCT

BACKGROUND OF THE INVENTION

1. Field of the Invention

This invention relates to manufacturing of a hollow plastic product and in particular to a method and apparatus for manufacturing a hollow plastic product having an irregular structure, such as a projection which projects outwardly from the outer surface of the product or change in composition. More specifically, the present invention relates to a blow molding technique for fabricating a hollow plastic product having a desired shape which cannot be manufactured by conventional blow molding technology.

2. Description of the Prior Art

If it is desired to manufacture a hollow plastic product 2 having a projection 1 which projects outwardly from the outer surface of a main body 2' in accordance with the typical prior art technique, the main body 2' is first fabricated by blow molding and then the projection, which has been previously fabricated by any appropriate method, such as injection molding, is fixedly attached to the main body 2'. Such an approach is not advantageous because it requires multiple separate steps to carry out in manufacture and the connection between the main body 2' and the later-attached projection 1 is not reliable and low in strength. On the other hand, it is true that the projection 1 may be manufactured together with the main body 2' at the same time by blow molding; in this case, however, a significantly large flash is necessarily formed, and, thus it is expensive and time consuming to remove such a large flash, not to mention the significant waste of material.

Furthermore, it is sometimes desired that a hollow plastic product differs in composition depending on the location, thereby providing different properties. For example, in a hollow plastic tube it is often desired to have a relatively hard section to be fixedly attached to a metal fitting or the like and another section which is relatively soft for providing an easy bending characteristic. In such a case, a typical prior art approach would be to first form different sections separately and then put them together to form a final product. This approach is disadvantageous because such a multistep process is time consuming and expensive and the integrity of the final product is relatively poor.

SUMMARY OF THE INVENTION

It is therefore a primary object of the present invention to obviate the disadvantageous of the prior art as described above and to provide an improved method and apparatus for manufacturing a hollow plastic product.

Another object of the present invention is to provide an improved method and apparatus for manufacturing a hollow plastic product having a projection which projects outwardly from the outer surface of the product.

A further object of the present invention is to provide an improved blow molding method and apparatus for manufacturing a hollow plastic product having any desired shape and structure.

A still further object of the present invention is to provide an improved blow molding method and apparatus capable of manufacturing a hollow plastic product having locally different compositions and properties.

A still further object of the present invention is to provide an improved blow molding method and apparatus capable of manufacturing a hollow plastic product of complicated structure in a reduced number of steps.

Other objects, advantages and novel features of the present invention will become apparent from the following detailed description of the invention when considered in conjunction with the accompanying drawings.

BRIEF DESCRIPTION OF THE DRAWINGS

FIG. 4 is a plan view showing a mold half having a groove provided with an outwardly extending projection 10a;

FIG. 9 is a schematic illustration showing a modified blow molding apparatus constructed in accordance with a further embodiment of the present invention;

DESCRIPTION OF THE PREFERRED EMBODIMENTS

In accordance with the first aspect of the present invention, there is provided a process for manufacturing a hollow plastic product including at least one tubular section and at least one projecting section projecting outwardly from said tubular section, comprising the steps of: preparing a first mold half engraved with a first groove defining a part of mold cavity corresponding in shape to a hollow plastic product to be molded, said first groove including at least one tubular portion and at least one projecting portion which correspond to the tubular and projecting sections of the product, respectively; supplying a clump of first molten molding material to said at least one projecting portion; supplying a parison of second molten molding material to said at least one tubular portion; bringing a second mold half engraved with a second groove defining the remaining part of the mold cavity into contact with the first mold half; and blowing a pressurized gas into the parison while maintaining the first and second mold halves clamped together. In the preferred embodiment, the first and second molten molding materials are identical.

Figure 2:
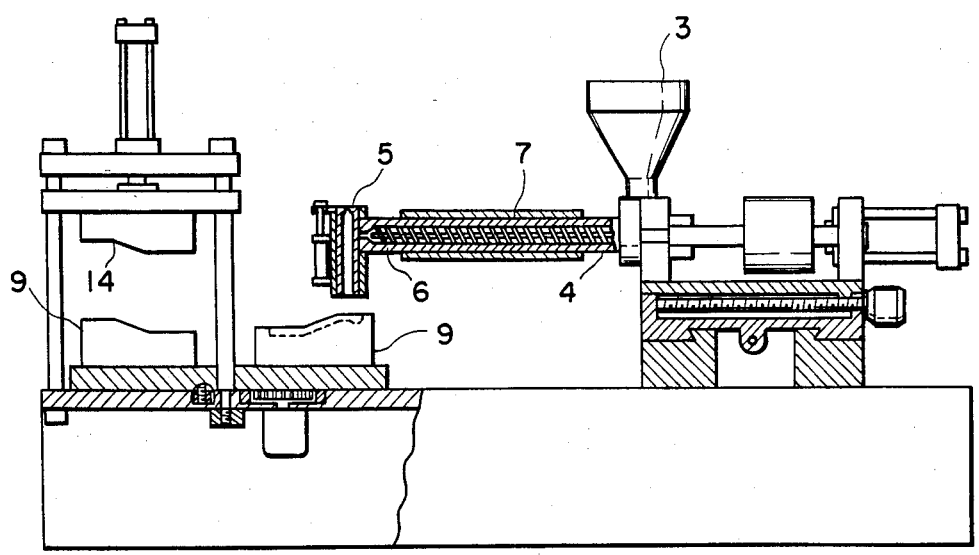
FIG. 2 is a front view showing the overall structure of apparatus for manufacturing a hollow plastic product constructed in accordance with one embodiment of the present invention.

Referring now to FIG. 2, there is shown a blow molding apparatus constructed in accordance with one embodiment of the present invention, in which a hopper 3 stores a quantity of molding material, such as any well-known plastic material suitable for use in blow molding. A dispensing tube 4 is provided at the bottom of the hopper 3 extending horizontally and in communication with the hopper 3. At the forward end of the dispensing tube 4 is provided an extrusion nozzle 5. An auger screw 6 is rotatably housed in the dispensing tube 4. A heat band 7 is wrapped around the outer peripheral surface of the tube 4 thereby allowing the molding material in transportation through the tube 4 to be molten in state and thus easily flowable. Thus, as the screw 6 is driven to rotate, the molding material in the hopper 3 is fed into the dispensing tube 7 and the molding material thus fed becomes molten in state due to the heat applied from the heater band 7 and transported toward its forward end, or the extrusion nozzle 5.

The molten molding material thus transported is extruded from the nozzle 5 in the form of a parison which is then supplied into a first groove (shown by the dotted line in FIG. 2) engraved in a first mold half 9, which, in turn, is fixedly mounted on a turntable. Above the turntable at a different location is disposed a second mold half 14 engraved with a second groove, which defines a mold cavity corresponding in outer shape to a plastic product to be molded when the first and second mold halves are brought into mating contact. The second mold half 14 is supported to be vertically movable and thus the second mold half 14 may be brought into contact with the first mold half 9 set in position therebelow. Although not shown specifically since it is self evident for one skilled in the art, the first and second mold halves 9 and 14 in mating contact are clamped and a pressurized gas may be introduced into the parison placed between the clamped mold halves to carry out blow molding. Thereafter, when the parison cools down to a point that it can maintain its molded shape, the second mold half 14 is moved upward away from the first mold half 9 fixedly attached to the turntable. The apparatus illustrated in FIG. 2 is advantageous because two or more first mold halves 9 may be provided on the turntable to carry out different steps in parallel.

Figure 1:
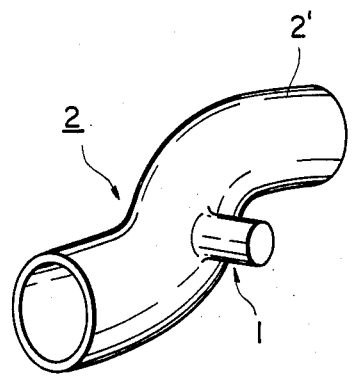
FIG. 1 is a perspective view showing a hollow plastic product having an outwardly extending projection which may be manufactured advantageously in accordance with the present invention.
Figure 3:
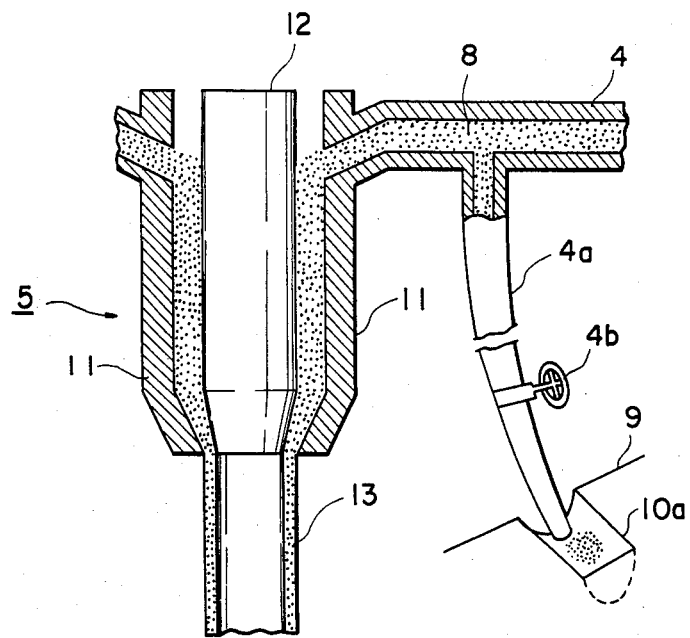
FIG. 3 is a schematic illustration showing a modified apparatus including a separate supply line for supplying additional molding material.
Figure 4:
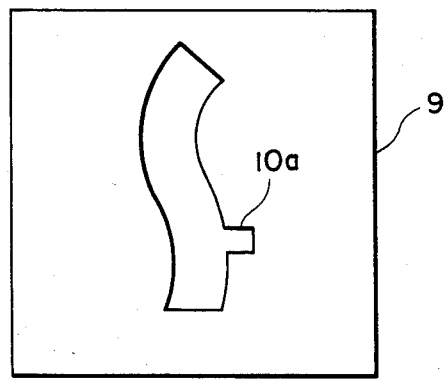

The apparatus shown in FIG. 2 is advantageously modified as shown in FIG. 3 for manufacturing a hollow plastic product having a projection shown in FIG. 1. That is, in the structure shown in FIG. 3, there is provided a bypass pipe 4a extending from and in communication with the dispensing pipe 4. The bypass pipe 4a is provided with a control valve 4b which controls the opening and closing of the bypass pipe 4a. FIG. 4 illustrates in plan view the first mold half 9 having a groove engraved therein, which defines a mold cavity when it is brought into mating contact with the second mold half 14. The mold half illustrated in FIG. 4 is to be used for manufacturing the hollow plastic product shown in FIG. 1, which includes the main body 2', which is tubular and generally in the shape of "S", and the single projection 1 which projects outwardly from the outer peripheral surface of the main body 2'. Thus, as shown in FIG. 4, the groove engraved in the first mold half 9 includes a generally S-shaped half-tube portion and a projecting portion 10a, which corresponds to the projection 1 in shape.

In accordance with this aspect of the present invention, the S-shaped portion of the groove engraved in the first mold half 9 is supplied with a parison 13 extruded out of the extrusion nozzle 5 including an outer cylinder 11 and a mandrel 12 which extends through the outer cylinder 11 with a gap therebetween, with the gap being in fluidic communication with the dispensing pipe 4. Thus, the parison 13 is formed as the molten molding material is extruded out of the nozzle 5 as supplied from the dispensing pipe 4 through the gap defined between the outer cylinder 11 and the mandrel 12. On the other hand, the molten molding material in the dispensing pipe 4 is also supplied to the projection portion 10a of the first molding half 9 through the bypass pipe 4a by operating the valve 4b. The molten molding material supplied through the bypass pipe 4a is in the form of a clump and such a clump is preferably slightly larger in volume than the projection cavity defined by the projecting portion 10a when the two mold halves are brought into contact. It is to be noted, however, that in the case where the molding material stored in the hopper 3 is sufficiently molten in state, it may be partly taken out of the hopper 3 by hand or any appropriate tool and supplied to the projecting portion 10a in the first mold half 9.

Figure 5:
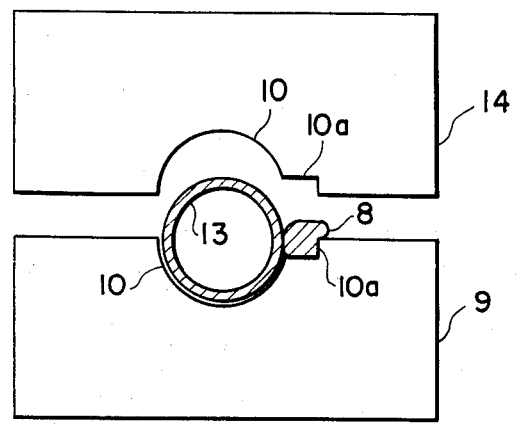
FIG. 5 is a schematic illustration showing the condition in which the upper and lower mold halves are about to be brought into contact with a parison 13 and a clump of molding material in place.

The condition with the parison 13 being placed in the S-shaped tubular groove portion 10 and the clump 8 of molten molding material placed in the projecting groove portion 10a of the first mold half 9 is seen in FIG. 5. After placing the parison 13 and the clump 8 in position as shown in FIG. 5, the second mold half 14 is brought into mating contact with the first mold half 9 as indicated by the arrows in FIG. 5. Thereafter, as is known for one skilled in the art, the first and second mold halves 9 and 14 are clamped and a pressurized gas is introduced into the parison 13 placed in the mold cavity defined between the two mold halves 9 and 14 to carry out blow molding. Surprisingly, it has been found that when blow molding is carried out under such circumstances, the clump 8 becomes well integrated with the parison 13 thereby forming a plastic product of unitary structure. In order to secure an excellent integrity between the resulting tubular section 2' and the projection 1, it is only necessary that the clump 8 be supplied slightly larger in volume than the projection cavity defined by the projecting portions 10a, 10a when the two mold halves 9 and 14 are brought into contact.

In the illustrated embodiment, the clump 8 is of the same material as the parison 13. However, the clump 8 may differ in material from the parison 13, though it is important that the material of clump 8 be conformable with the material of parison 13 when different materials are used. Thus, it is preferable that the clump 8 and parison 13 are of the same material.

After introduction of pressurized gas, the mold halves 9 and 14 are maintained clamped together for a predetermined time period until the molded parison and clump become sufficiently cooled to obtain a self-shape holding ability. Thereafter, the mold halves 9 and 14 are separated from each other to remove the resulting plastic product thus molded.

As described above, in accordance with this aspect of the present invention, the formation of a flash may be minimized even if a desired plastic product to be molded has a projection which extends significantly outwardly from the outer peripheral surface of the product. Minimization of flash formation causes minimization in secondary processing for flash removal and in waste of material. Furthermore, since the clump 8 becomes integrated with the parison 13 after blow molding, there is obtained a plastic product of unitary structure even if the plastic product has an irregularly shaped portion such as a projection so that the product is high in integrity and in durability. Thus, the product manufactured according to the present invention may be advantageously used as a duct which is subjected to severe vibration, e.g., the duct of an automobile air conditioner.

Figure 6:
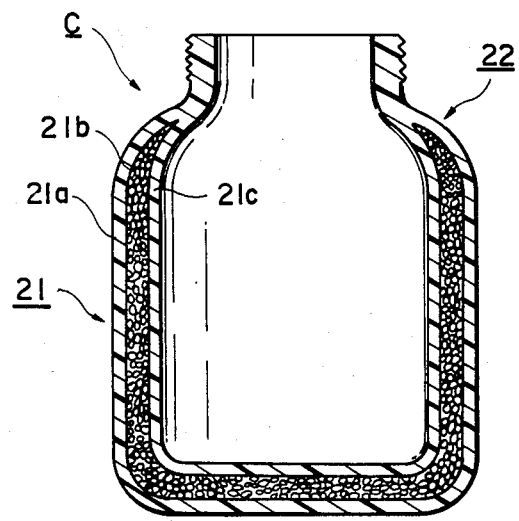
FIG. 6 is a cross-sectional view showing a plastic container having a three layer structure, which may be advantageously manufactured according to the method of the present invention.

FIG. 6 shows another plastic product c having a multilayer structure which can be advantageously manufactured by blow molding in accordance with another aspect of the present invention. As shown, the product c is a bottle-shaped container having a three layer structure excepting its mouth section 22. That is, the body 21 of container c includes relatively rigid outer and inner layers 21a and 21c and a foam material layer 21b which is sandwiched between the outer and inner layers 21a and 21c and which is excellent in heat shielding characteristic though its rigidity is rather poor. The mouth section 22 is formed as a single layer from a relatively rigid material because threads are formed at the outer peripheral surface thereof. When manufacturing such a container c according to a typical prior art method, the body and mouth sections 21 and 22 are first formed separately and then these sections are put together adhesively or by any other method. However, such a prior art approach is disadvantageous because the resulting structure is relatively poor in durability due to the poor integrity between the body and mouth sections 21 and 22. Furthermore, such a prior art approach is also disadvantageous from a manufacturing viewpoint since it requires a step of combining the body and mouth sections 21 and 22.

Figure 7:
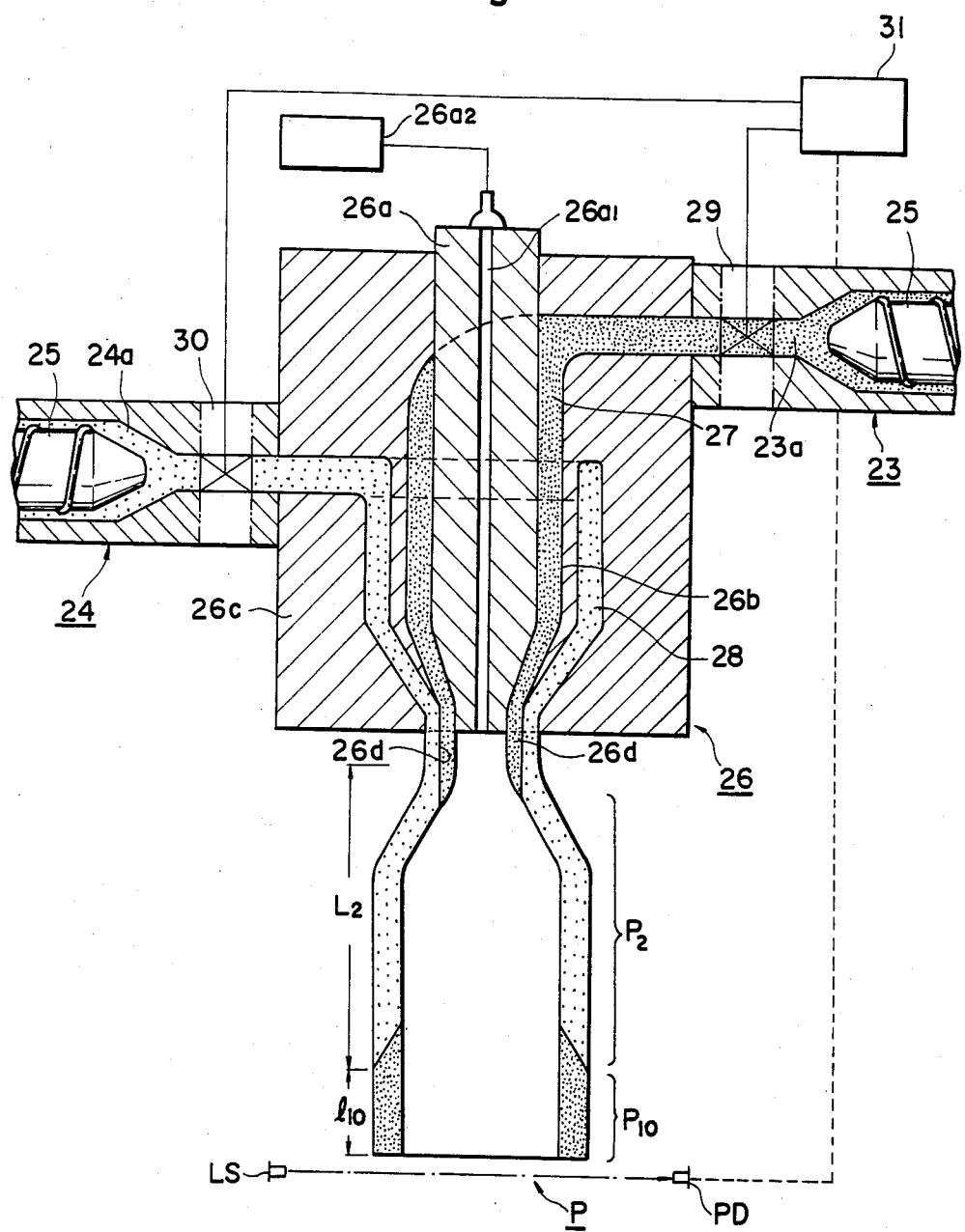
FIG. 7 is a schematic illustration showing a novel blow molding apparatus constructed in accordance with another embodiment of the present invention.
Figure 8A:
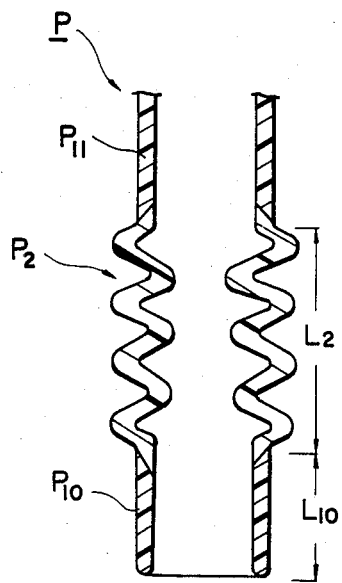
FIGS. 8a through 8c are schematic illustrations in cross-section showing several typical hollow plastic products which may be advantageously manufactured by the apparatus shown in FIG. 7.
Figure 8B:
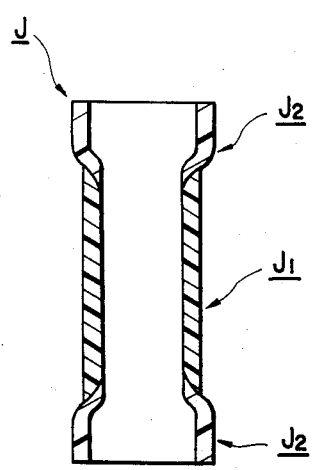
Figure 8C:
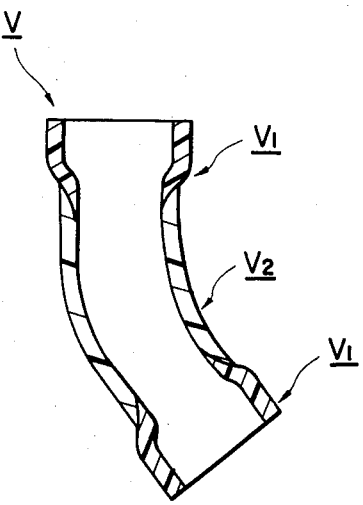

FIG. 7 illustrates schematically an apparatus for manufacturing a hollow plastic product having regions of different compositions and this structure may be advantageously implemented in the apparatus shown in FIG. 2. The apparatus shown in FIG. 7 may be used to manufacture various types of hollow plastic products having regions of different compositions. Some of the examples which may be manufactured using the apparatus shown in FIG. 7 are shown in FIGS. 8a through 8c. A hollow plastic product P shown in FIG. 8a includes a bellows section $P_2$ and a pair of straight pipe sections $P_{10}$ and $P_{11}$, at each end of the bellows section $P_2$. In the illustrated example, the bellow section $P_2$ is comprised of a relatively soft material, such as low-density polyethylene (LD-PE), and the straight pipe sections $P_{10}$ and $P_{11}$ are comprised of a relatively rigid material, such as high-density polyethylene (HD-PE), so that the pipe P has an increased stretchability. On the other hand, FIG. 8b shows another hollow plastic product J having a pipe section $J_1$ comprised of a relatively rigid material and a pair of connecting sections $J_2$ and $J_2$, each comprised of a relatively soft material. With such a pipe J, the connecting section $J_2$ may be easily fitted onto an object to be connected. FIG. 8c shows an elbow V which includes a curved pipe section $V_2$ comprised of a relatively soft material and a pair of connecting sections $V_1$, each comprised of a relatively hard material. In all of these illustrated products, different regions comprise different materials having different characteristics. These produces are preferably manufactured by the apparatus shown in FIG. 7.

Referring now to FIG. 7, a pair of dispensing pipes 23 and 24 are connected to the extrusion nozzle 26 as extending from respective hoppers (not shown). The pair of dispensing pipes 23 and 24 define dispensing passages 23a and 24a, respectively, each of which is provided with an auger screw 25. It is to be noted that each of the dispensing pipes 23 and 24 is constructed similarly with the dispensing pipe in the previous embodiment, so that as the screws 25, 25 are driven to rotate, the molten molding material, typically a thermoplastic material, is supplied to the nozzle from each of the hoppers.

The nozzle 26 is provided with a mandrel 26a having a convergent bottom end extending vertically and located at the center of the nozzle 26. The mandrel 26a is provided with a center hole $26a_1$ which extends through the mandrel 26a in the longitudinal direction and which is in communication with a source of pressurized gas, such as an air compressor $26a_2$. The nozzle 26 is also provided with a first flow passage 27 which is defined between the outer surface of mandrel 26a and a partition wall 26b formed in the nozzle 26 and which communicates with the dispensing passage 23a through a valve 29. The nozzle 26 is further provided with a second passage 28 in the form of a ring and concentric with the first passage 27, and the second flow passage 28 is defined between the partition wall 26b and a body 26c of the nozzle 26. The bottom ends of the first and second flow passages 27 and 28 meet at a point close to the bottom end surface of the nozzle 26 thereby defining a parison discharge opening 26d between the nozzle body 26c and the bottom end of the mandrel 26a. The first flow passage 27 is communicatable with the dispensing passage 23a through the valve 29; whereas, the second flow passage 28 is communicatable with the dispensing passage 24a through a valve 30. It is to be noted that the nozzle 26 is positioned above a mold bottom half (not shown) when a parison P is extruded out of the nozzle 26.

As described above, the valves 29 and 30 are provided between the first passage 27 and dispensing passage 23a and between the second passage 28 and dispensing passage 24a, respectively, and these valves 29 and 30 are connected to a control unit 31. Thus, under control of the control unit 31, the valves 29 and 30 control the flow rate of molten molding material flowing through the respective passages. In the preferred embodiment, the control unit 31 includes a microcomputer which controls the operation of each of the valves 29 and 30 in accordance with a selected program stored in memory also provided in the control unit 31. It is also important that the operation of each of the valves 29 and 30 be associated with the operation of each of the screws 25, 25 thereby preventing the pressure inside each of the passages 23a and 24a from becoming excessive. Also provided is a combination of a light source LS and a photodetector PD, which are provided opposite to each other at a predetermined distance from the nozzle 26. The light source LS directs a beam of light toward the photodetector PD, which supplies a signal to the control unit 31 for controlling the operation of each of the valves 29 and 30.

A process will now be explained for manufacturing the hollow plastic product shown in FIG. 8a using the apparatus shown in FIG. 7. As described before, in the case of manufacturing the pipe P having the bellows section $P_2$, it is preferable to use a soft resin material, such as LD-PE, for the bellows section $P_2$ and a hard resin material, such as HD-PE, for the other sections $P_{10}$ and $P_{11}$. As an alternative, however, use may be made of a combination of hard vinyl chloride and soft vinyl chloride. In the preferred embodiment, soft and hard resin materials are selected to have an affinity such that they can stick together strongly at the interface thereby allowing formation of an integrated structure or gradual change in composition. However, use may also be made of a combination of hard and soft resin materials having a relatively poor affinity, for example, by providing an adhesive agent between the two materials.

For the purpose of explanation, it will be assumed here that HD-PE is supplied to the first dispensing pipe 23 and LD-PE is supplied to the second dispensing pipe 24. Thus, HD-PE in molten state flows through the valve 29 when open into the first flow passage 27 in the nozzle 26 to reach the discharge opening 26d; on the other hand, LD-PE in molten state flows through the valve 30 when open into the second flow passage 28 to reach the discharge opening 26d.

First, in order to form a parison section $p_{10}$ corresponding to the pipe section $P_{10}$ of pipe P which is comprised of HD-PE, the valve 29 is set open and the first dispersing unit 23 is rendered operative while maintaining the valve 30 closed and the second dispensing unit 24 inoperative. As soon as the parison $p_{10}$ has been discharged over a length $l_{10}$ corresponding to the length $L_{10}$ of pipe section $P_{10}$ of product P, the control unit 31 supplies a signal to the valve 29 to have it closed and the first dispensing unit 23 is rendered inoperative; at the same time, the valve 30 is set open and the second dispensing unit 24 is rendered operative. Because of this, the material discharged out of the nozzle 26 through the discharging opening 26d is switched from HD-PE to LD-PE, which is the material to be used for forming the bellows section $P_2$ of product P.

In this instance, since the discharge opening 26d is located as separated away from each of the valves 29 and 30, the switching of materials does not take place immediately following the closing and opening operations of the respective valves 20 and 30 but the material gradually changes from one to the other as discharged out of the discharge opening 26d. Thus, as shown in FIG. 7, the interface between the two sections in the discharged parison becomes inclined with respect to the longitudinal axis of the discharged parison. This may be viewed as an advantage in a sense because the material change does not take place suddenly and there is formed a gradual change in mechanical strength.

Upon discharging of parison $p_2$ of LD-PE over a length $l_2$ which corresponds to the length $L_2$ of bellows section $P_2$, the control unit 31 again supplies a control signal to open the valve 29 and render the first dispensing unit 23 operative while causing the valve 30 to be shut off and the second dispensing unit 24 to be inoperative. Thus, the material discharged out of the discharge opening 26d gradually changes from LD-PE to HD-PE. Then, the parison thus discharged out of the discharge opening 26d is placed into a groove of a bottom mold half (not shown) positioned below the nozzle 26. Thereafter, as is obvious for one skilled in the art, the corresponding top mold half is clamped to the bottom mold half and a pressurized gas is introduced into the parison placed between the mold halves which are clamped together. In this instance, the pressurized gas is introduced into the parison through the air passage $26a_1$ as supplied from the pressurized gas source $26a_2$. In this manner, blow molding is carried out and there is obtained a molded plastic product P having the bellows section $P_2$ having increased stretchability.

In the above-described embodiment, the valves 29 and 30, preferably shut-off valves, are operated to be open and closed in association with the operation of the first and second dispensing units 23 and 24 in order to implement switching of materials to be discharged out of the opening 26d. However, as an alternative method, the switching of discharged materials may also be carried out by controlling the operating conditions of first and second dispensing units 23 and 24 while maintaining the valves 29 and 30 intact. In this case, the interface between the two sections different in material would be more inclined and this interface region with the presence of two different materials would be longer.

FIG. 9 shows a modified apparatus which is similar to the apparatus shown in FIG. 7 structurally in many aspects. Like numerals are used for like elements, and the same elements are not repeatedly described. In the FIG. 9 embodiment, no valves are provided in the passages for supplying molten molding materials to the discharge opening 26d of nozzle 26, unlike the previous embodiment. In the structure illustrated in FIG. 9, the mandrel 32 is coupled to a driving unit 33, such as a cylinder unit, which causes the mandrel 32 to move up and down with respect to the nozzle 26. The driving unit 33 is also connected to the control unit 31 so that its operation is controlled in accordance with a control signal supplied from the control unit 31. As will become clear later, the flow condition of molten molding material through the first flow passage 27 is controlled by the relative positional relation between the mandrel 32 and the nozzle 26.

Described more in detail as to the structure shown in FIG. 9, the mandrel 32 is formed with an outwardly projecting ridge 34 continuous in the circumferential direction and located at a position close to its bottom end. Furthermore, the intermediate wall 26b, cylindrical in shape and depending from the merging point between the first and second flow passages 27 and 28 in the nozzle 26 is similarly formed with an inwardly projecting ridge 35 continuous in the circumferential direction and located at its bottom. These ridges 34 and 35 are so formed in height that they may be brought into sealing contact when the mandrel 32 is pulled upward to its upper limit position. Thus, when the mandrel 32 is located at its upper limit position where the ridges 34 and 35 are in sealing contact, the first flow passage 27 is blocked so that no material can be discharged through the opening 26d as supplied from the first flow passage 27. In effect, the supply of material from the first flow passage 27 to the discharge opening 26d may be controlled by controlling the position of the mandrel 32 with respect to the nozzle 26.

Figure 10:
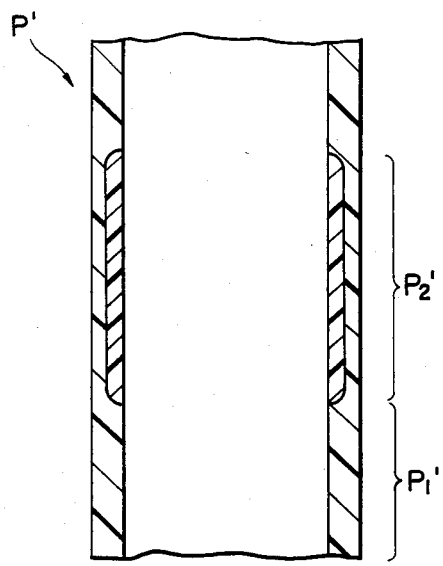
FIG. 10 is a schematic illustration showing in cross-section a parison p' having a local two-layer structure suitable for forming a plastic product having two layers different in material.

The apparatus illustrated in FIG. 9 is suitable for use in manufacturing a hollow plastic product having a two layer structure. Described more in detail in this respect, if it is desired to form a parison p' having a two-layer structure in part as shown in FIG. 10, the mandrel 32 is initially set at its upper limit position with the ridges 34 and 35 maintained in contact to block the first flow passage and a molten molding material is discharged out of the opening 26d as supplied only from the second flow passage 38, thereby forming a single layer portion $p_1'$. Then, the mandrel 32 is moved downward to cause the ridges 34 and 35 separated away from each other thereby opening the first flow passage 27 to allow the other molten molding material to be supplied to the opening 26d as supplied from the first flow passage 27, so that there is formed a parison $p_2'$ having a two-layer structure. Thereafter, the mandrel 32 is pulled upward to bring the ridge 34 in contact with the ridge 35 to again block the first flow passage 27 thereby allowing only the material to be supplied to the opening 26d from the second flow passage 28. As a result, there is obtained a parison p' as shown in FIG. 10 just by moving the mandrel 32 relative to the nozzle 26.

In the above-described embodiment, since the ridges 34 and 35, which, in effect, together function as a valve, are located closer to the discharge opening 26d, the supply of material from the first flow passage 27 is controlled with an excellent responsiveness so that the interface region between the mono-layer and two-layer sections in the parison p' may be minimized. This may also be viewed as an advantage depending on the condition. In the case where a plastic product is to be molded in a two-layer structure, the parison p' shown in FIG. 10 may be used. In this case, the mono-layer sections $p_1'$ are produced as losses; however, since these loss sections are comprised of a single material, they may be collected for reuse.

It should further be noted that the apparatus shown in FIG. 9 may also be used to manufacture any of the plastic products shown in FIGS. 8a through 8c. In this case, the switching of material may be carried out by controlling the operating condition of the second dispensing unit 24 with the mandrel 32 held at its lowered position thereby keeping the ridges 34 and 35 separated away from each other. As an alternative structure suitable for carrying out switching of two molding materials to be discharged out of the discharge opening 26d, a valve, similar to the valve 30 shown in FIG. 7, may be preferably provided at the junction between the second dispensing passage 24a and the second flow passage 28.

Figure 11:
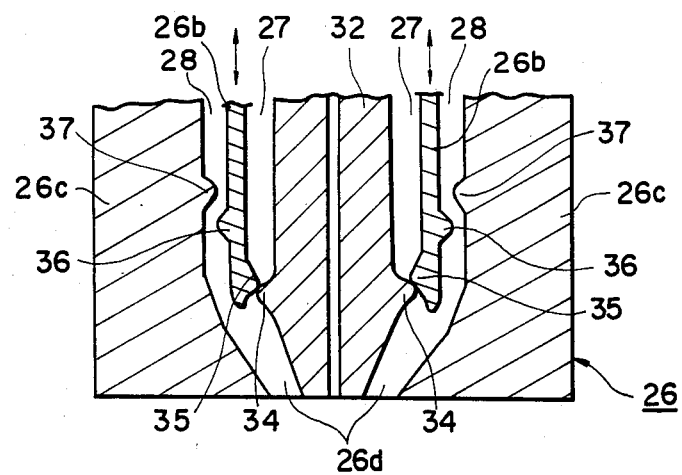
FIG. 11 is a schematic illustration showing a further modified blow molding apparatus constructed in accordance with a still further embodiment of the present invention.

FIG. 11 illustrates a further embodiment in which the intermediate cylindrical wall 26b is so provided to be movable with respect to the body 26c of nozzle 26 and the intermediate wall 26b is also provided with an outwardly projecting ridge 36 continuous in the circumferential direction at the outer peripheral surface thereof with a corresponding inwardly projecting ridge 37 formed at the body 26c of nozzle 26 similarly continuous in the circumferential direction. In this case, the mandrel 32 may be provided fixed in position with respect to the body 26c of nozzle 26. With this structure, the intermediate wall 26b may be moved up and down with respect to the mandrel 32 and body of nozzle 26 such that the ridges 34 and 35 are brought into contact to block the first flow passage 27 when the intermediate wall 26b is positioned at its bottommost position with the ridges 36 and 37 being separated away from each other to open the second flow passage 28 and the ridges 34 and 35 are separated away from each other to open the first flow passage 27 with the ridges 36 and 37 being brought into contact to block the second flow passage 28 when the intermediate wall 26b is positioned at its uppermost position. In this manner, the switching of molding materials may be easily carried out just by moving the intermediate wall 26b up and down.

Figure 12:
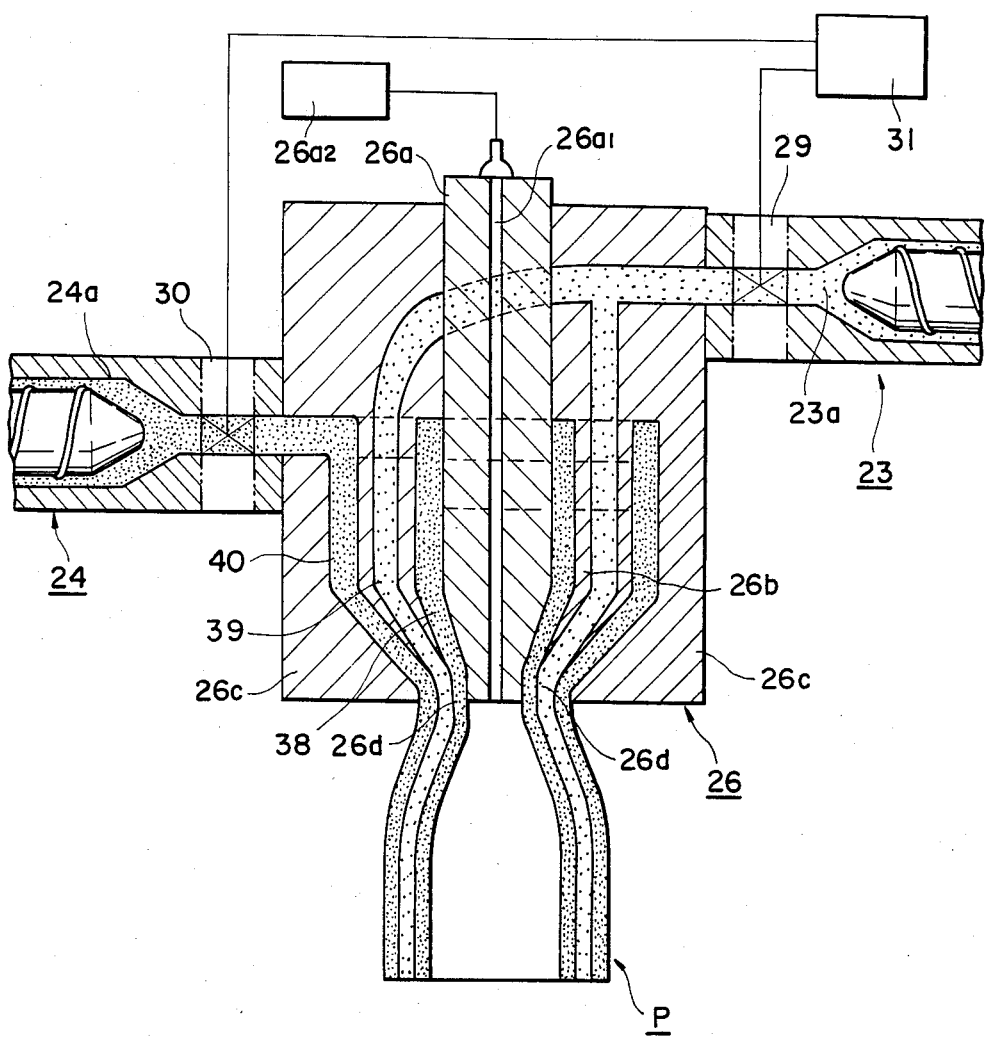
FIG. 12 is a schematic illustration showing a still further modified blow molding apparatus for forming a three-layer plastic product constructed in accordance with a still further embodiment of the present invention.

FIG. 12 illustrates a still further embodiment of the present invention, which is suitable for use in manufacturing a plastic product having a three-layer structure, such as the one shown in FIG. 6, in which the sandwiched layer and the two sandwiching layers are comprised of respective different materials. In this case, the two different molding materials to be used for the sandwiched and sandwiching layers have a good affinity or conformability, and typical combinations of materials will be tabulated below.

|    | sandwiching layer | sandwiched layer |
| --- | --- | --- |
| 1. | polycarbonate | methylmethacrylate foam |
| 2. | polystyrene | styrene-butadiene-styrene |
| 3. | polypropylene | polystyrene foam |
| 4. | ABS resin | polystyrene foam |
| 5. | HD-PE | LD-PE |

It is to be noted that the two molding materials to be used in combination in the present embodiment should not be limited only to the above, but many other combinations are also possible. If desired, two different molding materials which have a poor affinity may also be used in combination as long as an appropriate adhesive agent is provided between the two adjacent layers comprised of these different materials.

In the apparatus illustrated in FIG. 12, the nozzle 26 is formed with three flow passages 38, 39 and 40, in which the first and third passages 38 and 40 are commonly in communication with the second dispensing passage 24a and the sandwiched, second flow passage 39 is in communication with the first dispensing passage 23a. As with the apparatus shown in FIG. 7, the valves 29 and 30 are provided in the respective passages. Thus, in order to manufacture the bottle-shaped plastic product 22 of FIG. 6, a parison having a three-layer structure is first discharged out of the discharge opening 26d with both of the valves 29 and 30 open and the first and second dispensing units 23 and 24 in operation. Then the valve 29 is shut off and the first dispensing unit 23 is rendered inoperative while maintaining the valve 30 open and the second dispensing unit 24 in operation thereby causing the molding material supplied from the second dispensing unit 24 to be continuously discharged out of the discharge opening 26d to form a parison having a two-layer structure, which in effect is a single layer structure since the two layers are comprised of the same material.

In this case, the molding material supplied from the second dispensing unit 24 is relatively hard so that the portion of the parison discharged out of the discharge opening 26d which is comprised only of the material supplied from the second dispensing unit 24 will be used for defining the mouth section 22 of the plastic bottle C. It should further be noted that a flash formed in the present embodiment is mostly comprised of the material supplied from the second dispensing unit 24 so that the flash may be collected for reuse.

As a modified structure, the intermediate wall 26b separating the first passage 38 from the second passage 39 may be movable up and down with respect to the body 26c of nozzle 26 thereby controlling the flow of molding material supplied through the second passage 39. In this case, as described with respect to the previous embodiments, it is preferable to provide a pair of engageable ridges. If so structured, the switching of materials may be carried out at an increased responsiveness, and the loss of material may be minimized. As a further modification, there may be provided three dispensing units, one for each of the three flow passages 38–40. And, furthermore, a valve may be provided one for each of the three passages. With such a structure, a three-layer structure may be formed with three layers which are comprised of different materials. As an example, a plastic product having a three-layer structure, which includes an inner layer comrised of LD-PE, an intermediate layer comprised of ethylene-vinyl-acetate and an outer layer comprised of HD-PE may be easily manufactured.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A process for manufacturing a hollow plastic product including at least one tubular section and at least one projecting section projecting outwardly from said tubular section, comprising the steps of:
    preparing a first mold half engraved with a first groove defining a part of a mold cavity corresonding in shape to said hollow plastic product to be molded, said first groove including at least one tubular portion and at least one projecting portion which correspond to said tubular and projecting sections of the product, respectively;
    supplying a clump of first molten molding material to said at least one projecting portion of said first mold half;
    supplying a parison of second molten molding material to said at least one tubular portion of said first mold half;
    bringing a second mold half engraved with a second groove defining the remaining part of the mold cavity into contact with the first mold half whose said at least one projecting portion has been supplied with said clump and said at least one tubular portion has been supplied with said parison; and
    introducing a pressurized gas into said parison while maintaining said first and second mold halves clamped together, thereby carrying out blow molding to have said clump and said parison integrated together.

2. The process of claim 1 wherein said first and second molten molding materials are identical.

3. The process of claim 2 wherein said first molten molding material is a part of said second molten molding material.

4. The process of claim 1 wherein a plurality of said first mold halves are mounted on a turntable which is driven to rotate intermittently, wherein said steps for supplying said clump and said parison are carried out when one of said plurality of first mold halves is located at a first station and said steps of bringing and introducing are carried out when another of said plurality of first mold halves is located at a second station.

5. Apparatus for manufacturing a hollow plastic product including at least one tubular section and at least one projecting section which projects outwardly from an outer surface of said tubular section, comprising:
    a first mold half engraved with a first groove including at least one tubular portion corresponding to said tubular section of said product and at least one projecting portion corresponding to said projecting section of said product;
    first supplying means for supplying a parison of first molding material into said tubular grooved portion of said first mold half;
    second supplying means for supplying a clump of second molding material into said projecting grooved portion of said first mold half;
    a second mold half engraved with a second groove, which defines a mold cavity corresponding in outer shape to said product to be manufactured when said second mold half is brought into mating contact with said first mold half;
    means for bringing said second mold half into mating contact with said first mold half after having supplied said parison into said tubular grooved portion and said clump into said projecting grooved portion; and
    means for introducing a pressurized gas into said parison while maintaining said first and second mold halves clamped together after said second mold half has been brought into mating contact with said first mold half to carry out blow molding thereby causing said clump to become integrated with said parison.

6. The apparatus of claim 5 wherein said first and second molding materials are identical.

7. The apparatus of claim 5 wherein said second supplying means includes a bypass line extending from said first supplying means for supplying a part of said first molding material to said projecting portion of said first mold half as a clump, said bypass line being provided with a valve which may be operated to open and close said bypass line.

* * * * *